United States Patent
Chang et al.

(10) Patent No.: US 11,221,005 B2
(45) Date of Patent: Jan. 11, 2022

(54) PNEUMATIC PUMP

(71) Applicant: KOGE MICRO TECH CO., LTD., New Tapei (TW)

(72) Inventors: Chih Chang, New Taipei (TW); Qing-Xiang Xu, New Taipei (TW)

(73) Assignee: KOGE MICRO TECH CO., LTD., New Taipei (TW)

( * ) Notice: Subject to any disclaimer, the term of this patent is extended or adjusted under 35 U.S.C. 154(b) by 182 days.

(21) Appl. No.: 16/553,655

(22) Filed: Aug. 28, 2019

(65) Prior Publication Data
US 2020/0088219 A1    Mar. 19, 2020

(30) Foreign Application Priority Data
Sep. 17, 2018 (CN) .......................... 201811081150.4

(51) Int. Cl.
| | |
|---|---|
| F04B 53/10 | (2006.01) |
| F04B 45/047 | (2006.01) |
| F04B 53/22 | (2006.01) |
| F04B 45/04 | (2006.01) |
| F04B 49/035 | (2006.01) |
| F04B 49/24 | (2006.01) |
| B60N 2/90 | (2018.01) |

(52) U.S. Cl.
CPC ........ *F04B 53/1032* (2013.01); *F04B 45/043* (2013.01); *F04B 45/047* (2013.01); *F04B 49/035* (2013.01); *F04B 49/24* (2013.01); *F04B 53/22* (2013.01); *B60N 2/914* (2018.02)

(58) Field of Classification Search
CPC .............. F04B 53/1032; F04B 43/0009; F04B 43/0045
See application file for complete search history.

(56) References Cited

U.S. PATENT DOCUMENTS

| | | | | |
|---|---|---|---|---|
| 3,628,704 A | * | 12/1971 | Corsette | ............... B65D 41/045 222/513 |
| 5,476,367 A | * | 12/1995 | Zimmermann | ....... F04B 53/105 417/307 |
| 5,632,607 A | * | 5/1997 | Popescu | ................ F04B 49/035 417/415 |
| 2014/0161654 A1 | * | 6/2014 | Dorfler | ................... F04B 49/22 417/443 |

(Continued)

*Primary Examiner* — Nathan C Zollinger
*Assistant Examiner* — Timothy P Solak
(74) *Attorney, Agent, or Firm* — Juan Carlos A. Marquez; Marquez IP Law Office, PLLC (57) ABSTRACT

A pneumatic pump having an overpressure protection valve having a gasket and spring that includes a diaphragm carrier, a diaphragm member, a valve base, a valve, a cap, a driving device and an overpressure protection valve is revealed. A pump chamber is formed between the diaphragm member and the valve base. The overpressure protection valve having a spring and a gasket. A discharge channel, an air-flow channel and a backflow channel are formed among the pump chamber, the valve base, the valve and the cap. The discharge channel, the overpressure protection valve and the spring chamber are separated. The gasket is disposed between the air-flow channel and the backflow channel for closing the air-flow channel normally. The driving device drives the diaphragm member for discharging air from the pump chamber through the discharge channel.

5 Claims, 9 Drawing Sheets

(56) References Cited

U.S. PATENT DOCUMENTS

2016/0017881 A1\* 1/2016 Han ..................... F04B 49/035
 417/307
2016/0348670 A1\* 12/2016 Sakohira ................. F04B 49/22

\* cited by examiner

PNEUMATIC PUMP

BACKGROUND OF THE INVENTION

1. Technical Field

The present invention relates to a pneumatic pump having an overpressure protection valve having a gasket and spring, especially to a pneumatic pump applied to vehicle seats, such as bladder inflators for vehicle seats, for control of bladders to change the outline of the area where users sit on the seat.

2. Description of Related Art

Pneumatic pumps are applied to vehicle seats such as bladder inflators for vehicle seats for control of bladders to change the outline of the area where users sit on the seat. The pneumatic pump mainly includes a pump chamber whose volume is adjusted by a drive unit. When the volume is increased, air is sucked from the surrounding environment to the pump chamber. But the air is delivered from the pump chamber to the outer space when the volume is decreased.

The pneumatic pump available now is also provided with an overpressure valve. When the load is too high, bladders for vehicle seats are exploded. A pressure relief opening is closed through a valve part of the overpressure valve and a spring in the spring chamber is loaded in the close direction. When the pressure in the pump chamber is over the preset limit, pressure relief is carried out through the spring in the overpressure valve. However, in the overpressure valve available now, noises are generated during pressure relief because that the spring chamber is directly communicating with the atmosphere.

Thus there is a room for improvement and there is a need to provide a pneumatic pump that has a novel design and overcomes the shortcomings mentioned above.

SUMMARY OF THE INVENTION

Therefore it is a primary object of the present invention to provide a pneumatic pump having an overpressure protection valve having a gasket and spring in which an intake chamber is communicating with a spring chamber of a cap to avoid noises generated during pressure relief of an overpressure protection valve. At the same time, a part of the air is reused during the pressure relief process so that the work efficiency of the pneumatic pump is increased.

The present invention provides a pneumatic pump having an overpressure protection valve having a gasket and spring comprising: a diaphragm carrier; a diaphragm member disposed on the diaphragm carrier and having a plurality of interlocking parts; a valve base which is arranged at one end of the diaphragm carrier so that the diaphragm member is located between the diaphragm carrier and the valve base and a pump chamber is formed between the diaphragm member and the valve base; a valve that is disposed on the valve base; a cap which is arranged over both the valve base and the valve and comprising a spring chamber and an intake chamber communicating with the spring chamber; a driving device connected to the interlocking parts; and an overpressure protection valve mounted in the cap and having a gasket and a spring; the spring mounted in the spring chamber of the cap and abutting against the gasket for pushing the gasket to move toward the valve base and the valve; wherein a discharge channel, an air-flow channel and a backflow channel are formed among the pump chamber, the valve base, the valve and the cap; and the discharge channel, the overpressure protection valve and the spring chamber are separated from one another; the gasket is disposed between the air-flow channel and the backflow channel while the air-flow channel is closed by the gasket so that the air-flow channel and the backflow channel are separated; wherein the driving device drives the diaphragm member to act for discharging air from the pump chamber through the discharge channel; wherein the gasket of the overpressure protection valve compresses the spring to open the air-flow channel when the pressure in the pump chamber is over a preset limit; thus air passes through the air-flow channel and the backflow channel.

Preferably, the cap includes an inner cap and an outer cap disposed over the inner cap. The spring chamber is formed between the inner cap and the outer cap while the gasket is arranged at the inner cap. The gasket includes a central part, an outer ring spaced apart from and located outside the central part, and a plurality of ribs connected between the central part and the outer ring. Normally the air-flow channel is closed by the central part of the gasket when the pressure in the pump chamber is under the preset limit.

Preferably, the central part of the gasket is provided with a post and a spring-fixing base is slipped over the post. One end of the spring is fixed on the spring-fixing base.

Preferably, a seal ring and a locking groove are disposed on one side of the central part close to the inner cap and one side of the outer ring close to the inner cap respectively. The seal ring abuts against the inner cap while the locking groove is locked with and connected to a locking body on the inner cap correspondingly.

Preferably, the gasket is disposed on one end of the air-flow channel that is away from the pump chamber while a sealed opening is formed on the one end of the air-flow channel that is away from the pump chamber. The sealed opening is arranged at the inner cap of the cap. A plurality of backflow ports is formed on the cap. The backflow ports are located between and communicating with the backflow channel and the sealed opening. A central part of the gasket when the pressure in the pump chamber is under the preset limit a central part of the gasket is put over the sealed opening for sealing the sealed opening so that the air-flow channel is closed. The seal ring is abutting against a periphery of the sealed opening on the inner cap. Once the gasket is moved and the sealed opening is opened, air in the air-flow channel flows through the sealed opening and the backflow ports and into the backflow channel.

Preferably, two positioning holes are arranged at an outer ring while the inner cap is provided with two positioning pins. Each of the two positioning pins is mounted into a corresponding positioning hole.

Preferably, the driving device includes a motor and a transmission part. The transmission part is connected between the motor and the interlocking parts of the diaphragm member.

Implementation of the present invention at least produces the following advantageous effects: the volume of the pump chamber of the pneumatic pump can be adjusted by using the driving device that drives the diaphragm member to act. The air is exhausted from the pump chamber and passed through the discharge channel to be output when the volume of the pump chamber is decreased. The intake chamber is communicating with the spring chamber of the cap so as to avoid noises generated during discharge of the air through the overpressure protection valve to the atmosphere. At the same time, the air can be reused after the pressure relief process so that the work efficiency of the pneumatic pump is increased.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
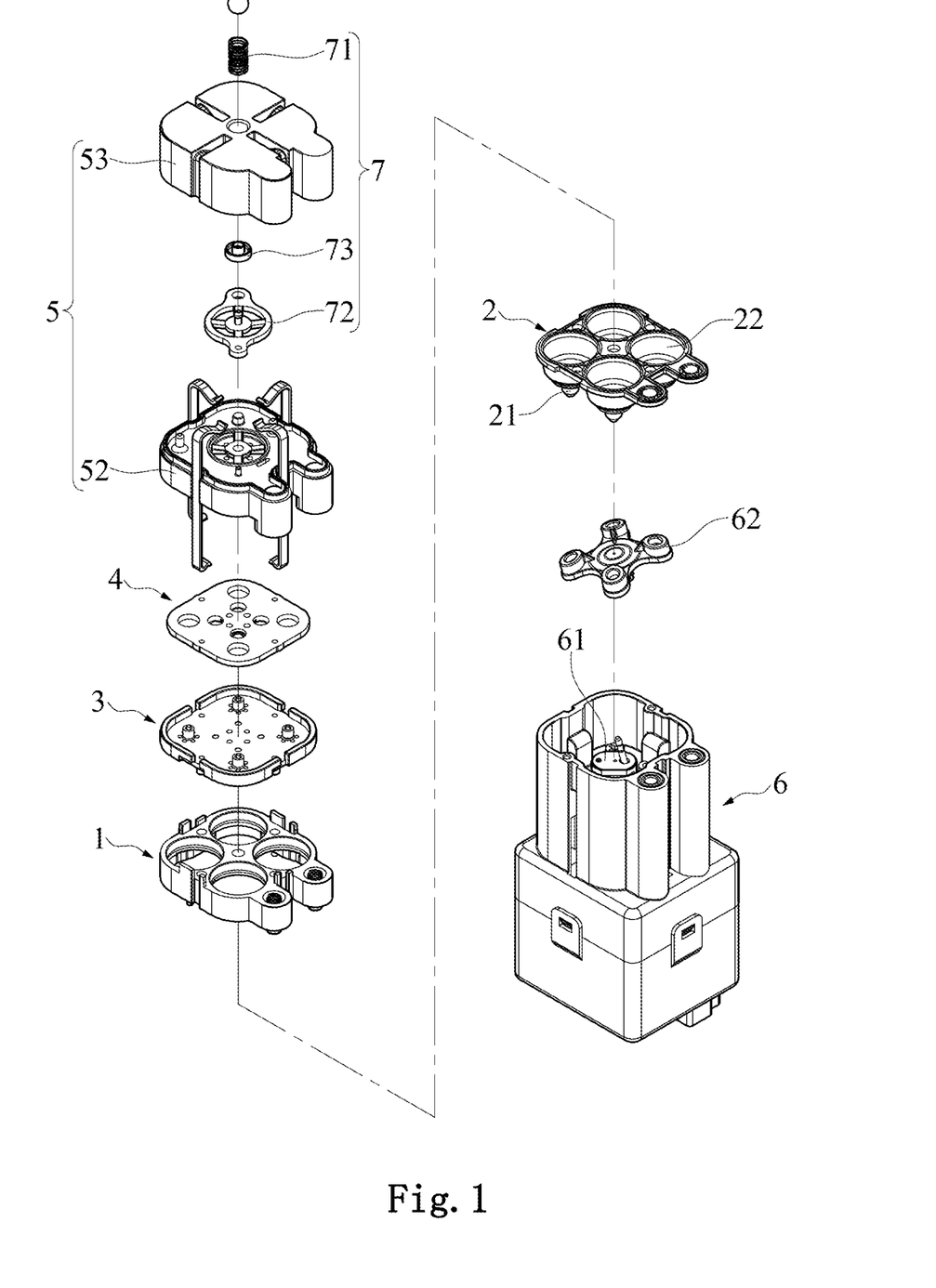
FIG. 1 is an explosive view of an embodiment of a pneumatic pump according to the present invention.
Figure 2:
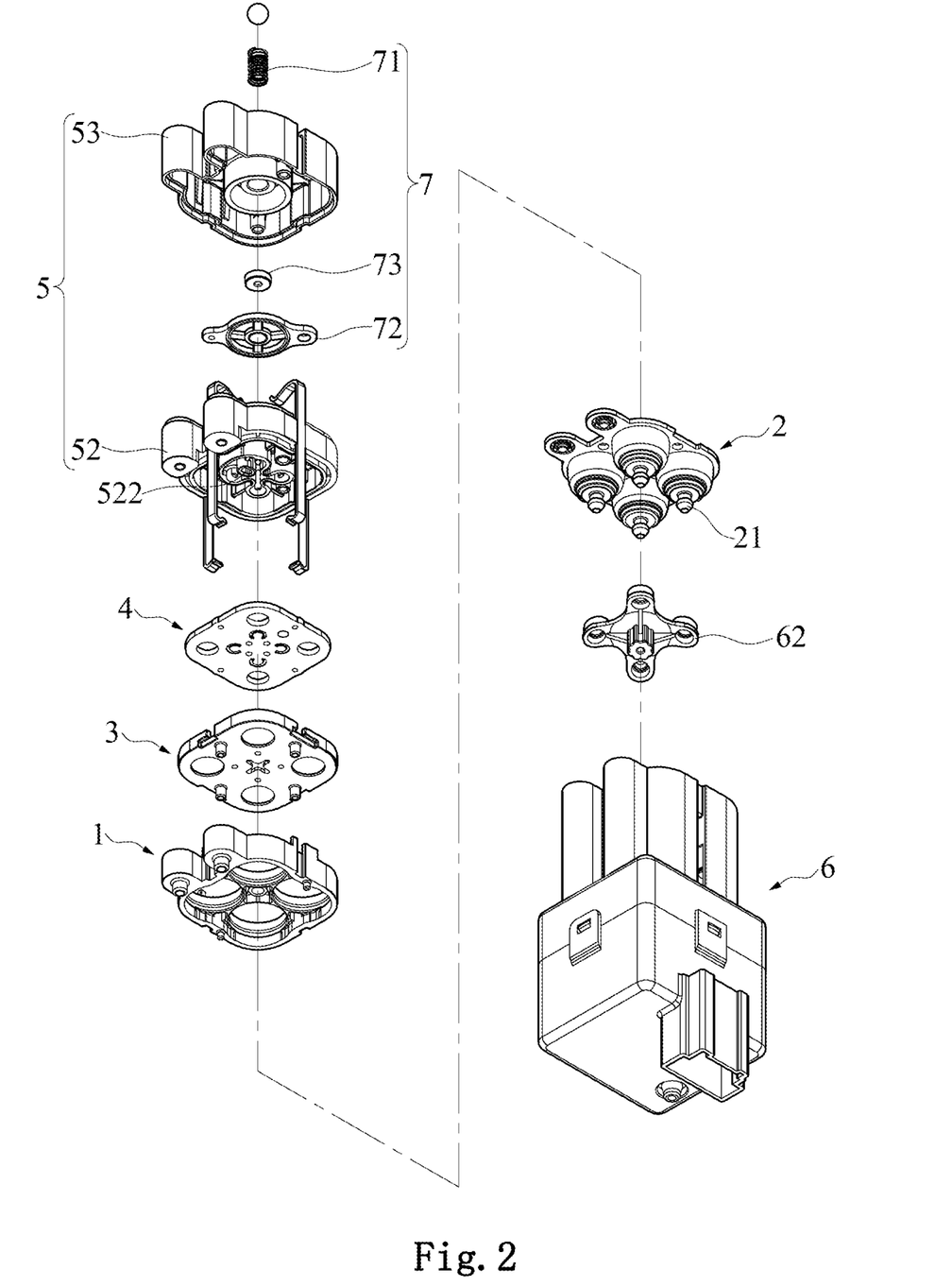
FIG. 2 is another explosive view of an embodiment of a pneumatic pump according to the present invention.
Figure 3:
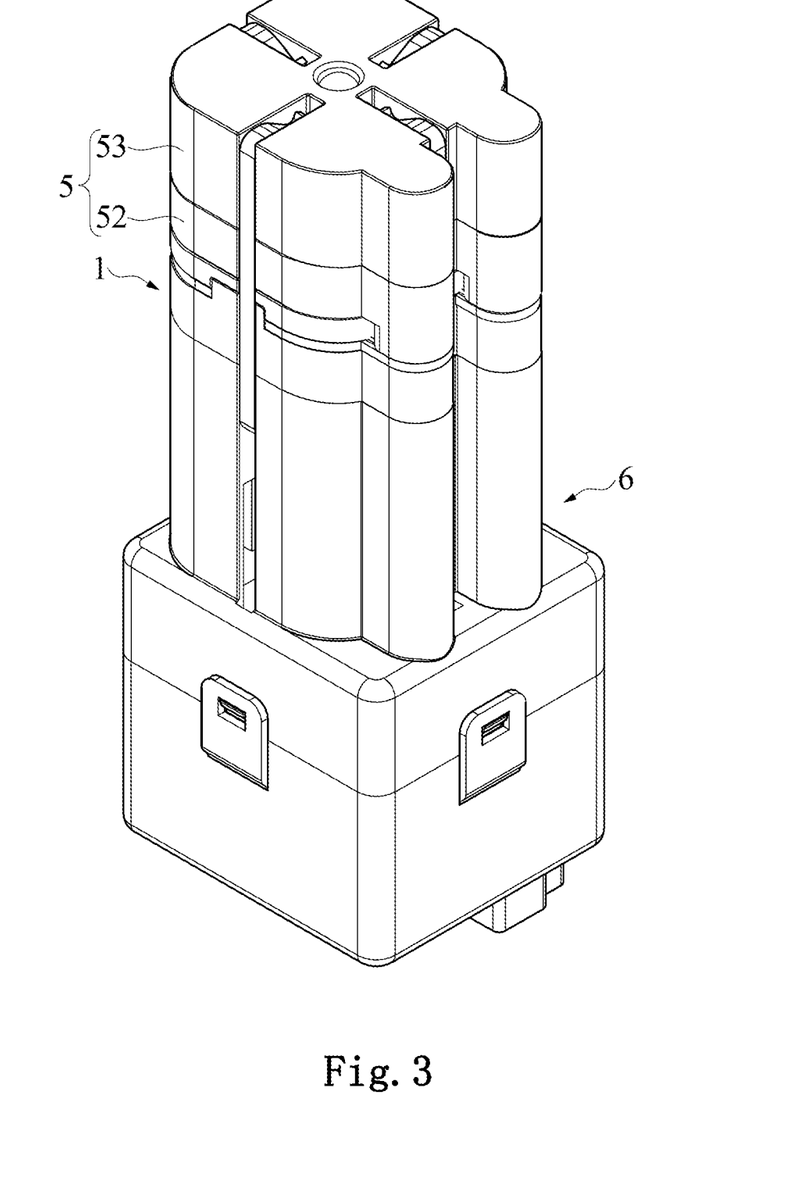
FIG. 3 is a perspective view of an embodiment of a pneumatic pump according to the present invention.

Refer to FIG. 1, FIG. 2 and FIG. 3, a pneumatic pump having an overpressure protection valve having a gasket and spring according to the present invention includes a diaphragm carrier 1, a diaphragm member 2, a valve base 3, a valve 4, a cap 5, a driving device 6 and an overpressure protection valve 7.

The diaphragm carrier 1 is used for mounting and loading the diaphragm member 2. The diaphragm member 2 made from elastic material (such as rubber) is disposed on the diaphragm carrier 1. The diaphragm member 2 consists of a plurality of interlocking parts 21 each of which includes a surface extending in the direction away from the valve base 3. The interlocking parts 21 are connected to the driving device 6 for being driven to move by the driving device 6. In this embodiment, the driving device 6 includes a motor 61 and a transmission part 62. The transmission part 62 is arranged and connected between the motor 61 and the interlocking parts 21 of the diaphragm member 2. Once the motor 61 rotates, the diaphragm member 2 is driven to move through the interlocking parts 21 driven by the transmission part 62.

The valve base 3 is arranged at one end of the diaphragm carrier 1 so that the diaphragm member 2 is located between the diaphragm carrier 1 and the valve base 3. A pump chamber 22 is formed between the diaphragm member 2 and the valve base 3. The volume of the pump chamber 22 changes with the action of the diaphragm member 2.

The valve 4 is disposed on the valve base 3 and assembled with the valve base 3 to form a valve unit. The valve 4 is a plate made from elastic material (such as rubber). The cap 5 is arranged over both the valve base 3 and the valve 4. The diaphragm carrier 1, the valve base 3 and the cap 5 are fixed by fixing members such as bolts or fasteners. After being disposed, the valve base 3, the valve 4 and the cap 5 not only allows air flowing into the pump chamber 22 for being output through the pump chamber 22 but also prevent the air from flowing back. The check valve available now can be used for preventing backflow of the air.

The overpressure protection valve 7 is mounted in the cap 5 and is composed of a spring 71, a gasket 72 and a spring-fixing base 73. A spring chamber 51 is formed in the cap 5 and the spring 71 is mounted therein. The gasket 72 is made from elastic material (such as rubber, thermoplastic, etc.). One end of the spring 71 is abutting against the gasket 72 for pushing the gasket 72 to move toward the valve base 3 and the valve 4. The gasket 72 can be aligned with the center portion of the valve base 3 and the valve 4. A discharge channel 100 is formed among the pump chamber 22, the valve base 3, the valve 4 and the cap 5 so that air can flows through the discharge channel 100 to be output. The discharge channel 100, the overpressure protection valve 7 and the spring chamber 51 are separated from one another, without communicating with one another. One end of the discharge channel 100 can be connected to bladders for vehicles seats by pipelines (not shown in figures) for inflation of the bladders.

Figure 8:
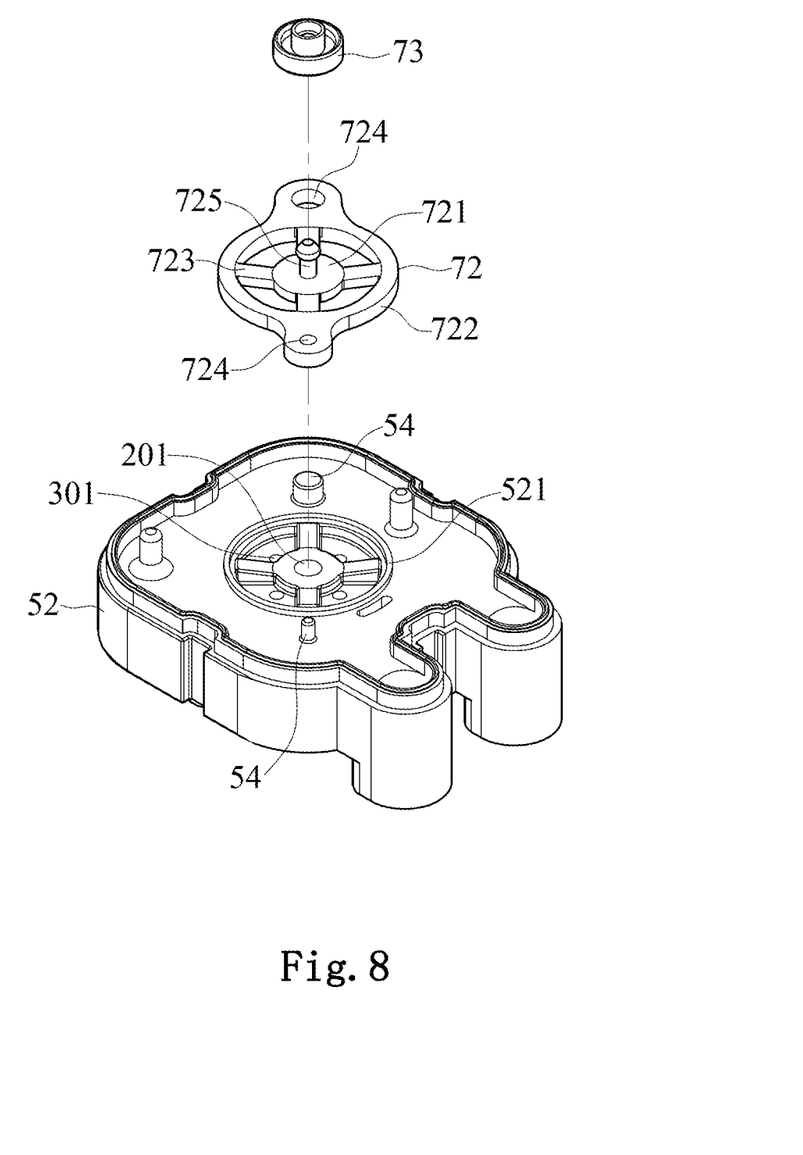
FIG. 8 is an explosive view of an overpressure protection valve in an embodiment of a pneumatic pump according to the present invention.
Figure 9:
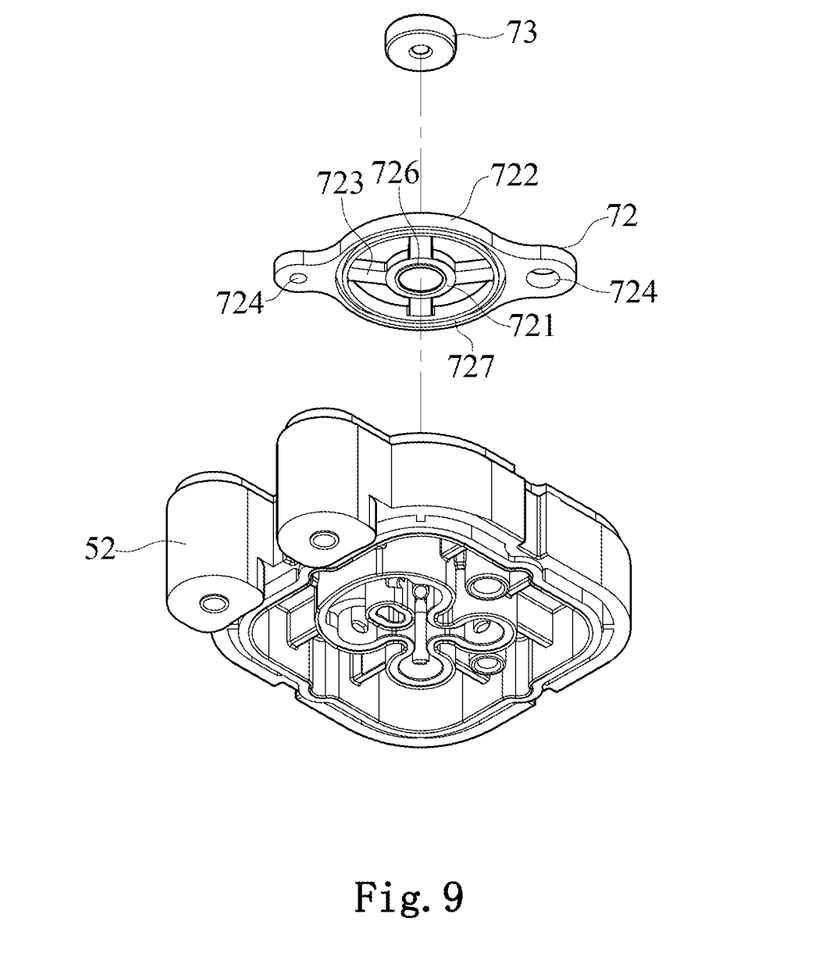
FIG. 9 is an explosive view of an overpressure protection valve in an embodiment of a pneumatic pump according to the present invention.

In this embodiment, the cap 5 is a two piece design further consisting of an inner cap 52 and an outer cap 53 disposed over the inner cap 52. The spring chamber 51 is formed between the inner cap 52 and the outer cap 53 while an intake chamber 522 is formed in the inner cap 52 and communicating with the spring chamber 51. As shown in FIG. 8 and FIG. 9, the gasket 72 is composed of a central part 721, an outer ring 722 spaced apart from and located outside the central part 721, a plurality of ribs 723 connected between the central part 721 and the outer ring 722, two positioning holes 724 arranged at the outer side of the outer ring 722, a post 725, a seal ring 726 and a locking groove 727. The inner cap 52 is provided with two positioning pins 54. The gasket 72 is disposed on the inner cap 52 by the two positioning pins 54 mounted in the two positioning holes 724 correspondingly.

The post 725 that is a cylinder with an umbrella-shaped top is located on the central part 721. The spring-fixing base 73 is slipped over the post 725 so that the spring-fixing base 73 is fixed on the gasket 72 with the cylinder having the umbrella-shaped top. One end of the spring 71 is fixed on the spring-fixing base 73. Thus one end of the spring 71 is leaning against the gasket 72 through the spring-fixing base 73. The seal ring 726 is disposed on one side of the central part 721 that is close to the inner cap 52. The locking groove 727 is arranged at one side of the outer ring 722 that is close to the inner cap 52. The seal ring 726 abuts against the inner cap 52 for improving sealing performance of the central part 721 of the gasket 72 while the locking groove 727 is locked with and connected to a lock body 521 on the inner cap 52 correspondingly for precise positioning of the gasket 72 on the inner cap 52. At the same time, the gasket 72 and the inner cap 52 will not loosen easily.

Refer to FIG. 4, FIG. 5, FIG. 6 and FIG. 7, an air-flow channel 200 and a backflow channel 300 are formed among the pump chamber 22, the valve base 3, the valve 4, and the cap 5. The gasket 72 is disposed between the air-flow channel 200 and the backflow channel 300, located on one end of the air-flow channel 200 that is away from the pump chamber 22. A sealed opening 201 is formed on the end of the air-flow channel 200 that is away from the pump chamber 22. The sealed opening 201 can be arranged at the inner cap 52 of the cap 5. A plurality of backflow ports 301 is formed on the cap 5. The backflow ports 301 are located between and communicating with the backflow channel 300 and the sealed opening 201. Under normal condition (the pressure in the pump chamber 22 is not over the preset limit), the sealed opening 201 is covered with the gasket 72. That means the central part 721 of the gasket 72 is put over the sealed opening 201 for sealing the sealed opening 201, as shown in FIG. 8. Thus the air-flow channel 200 is closed and is separated from the backflow channel 300. The seal ring 726 is abutting against the periphery of the sealed opening 201 on the inner cap for better sealing performance.

Under normal condition, air in the pump chamber 22 can only be output through the discharge channel 100. When the pressure in the pump chamber 22 is over the present threshold, air passes the air-flow channel 200 to push the gasket 72 so that the sealed opening 201 is opened. At the moment, the air in the air-flow channel 200 flows through the sealed opening 201 and the backflow ports 301 and then enters the backflow channel 300 for relieving pressure.

Figure 4:
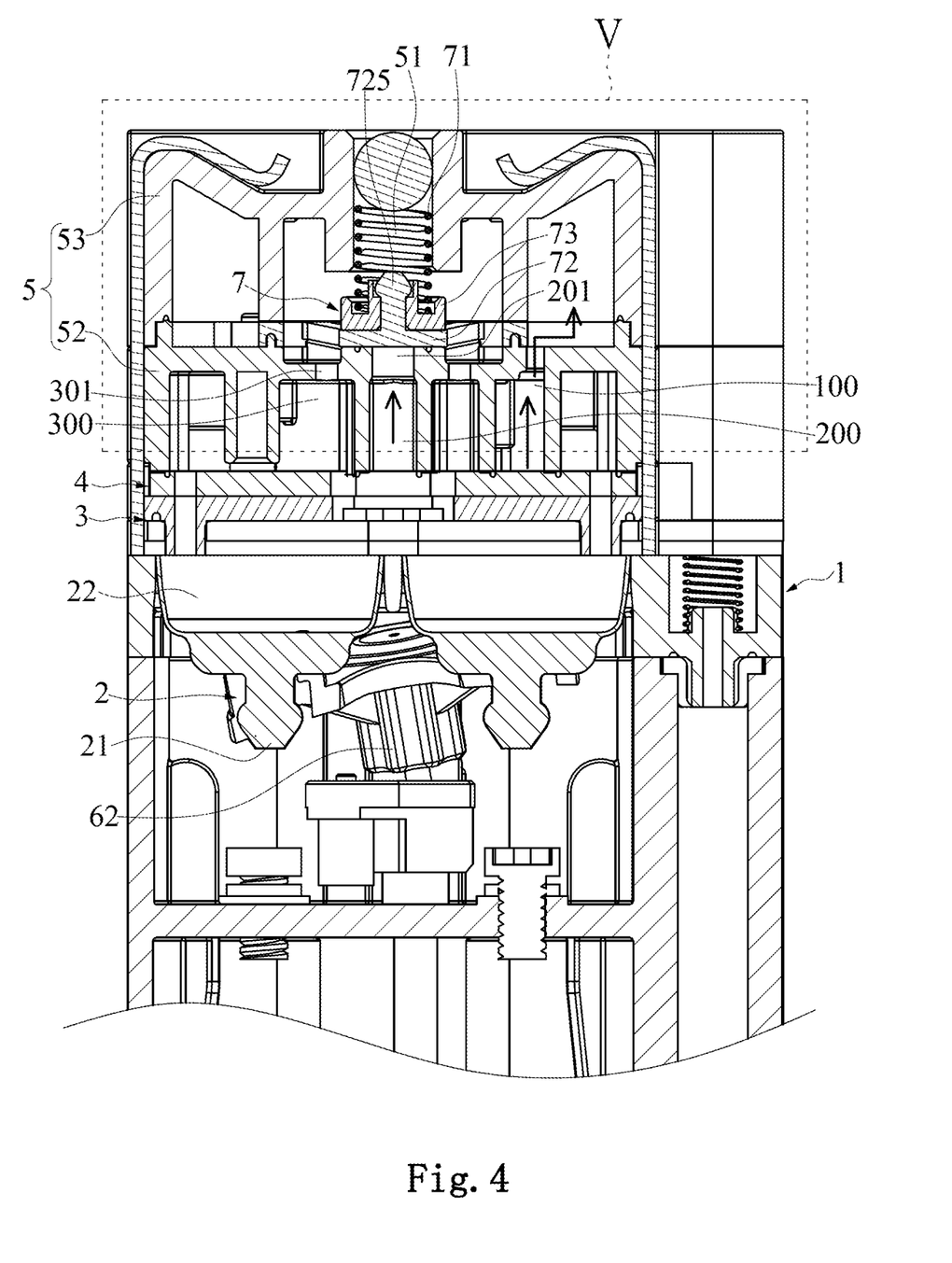
FIG. 4 is a sectional view of an embodiment of a pneumatic pump in which an overpressure protection valve is closed according to the present invention.
Figure 5:
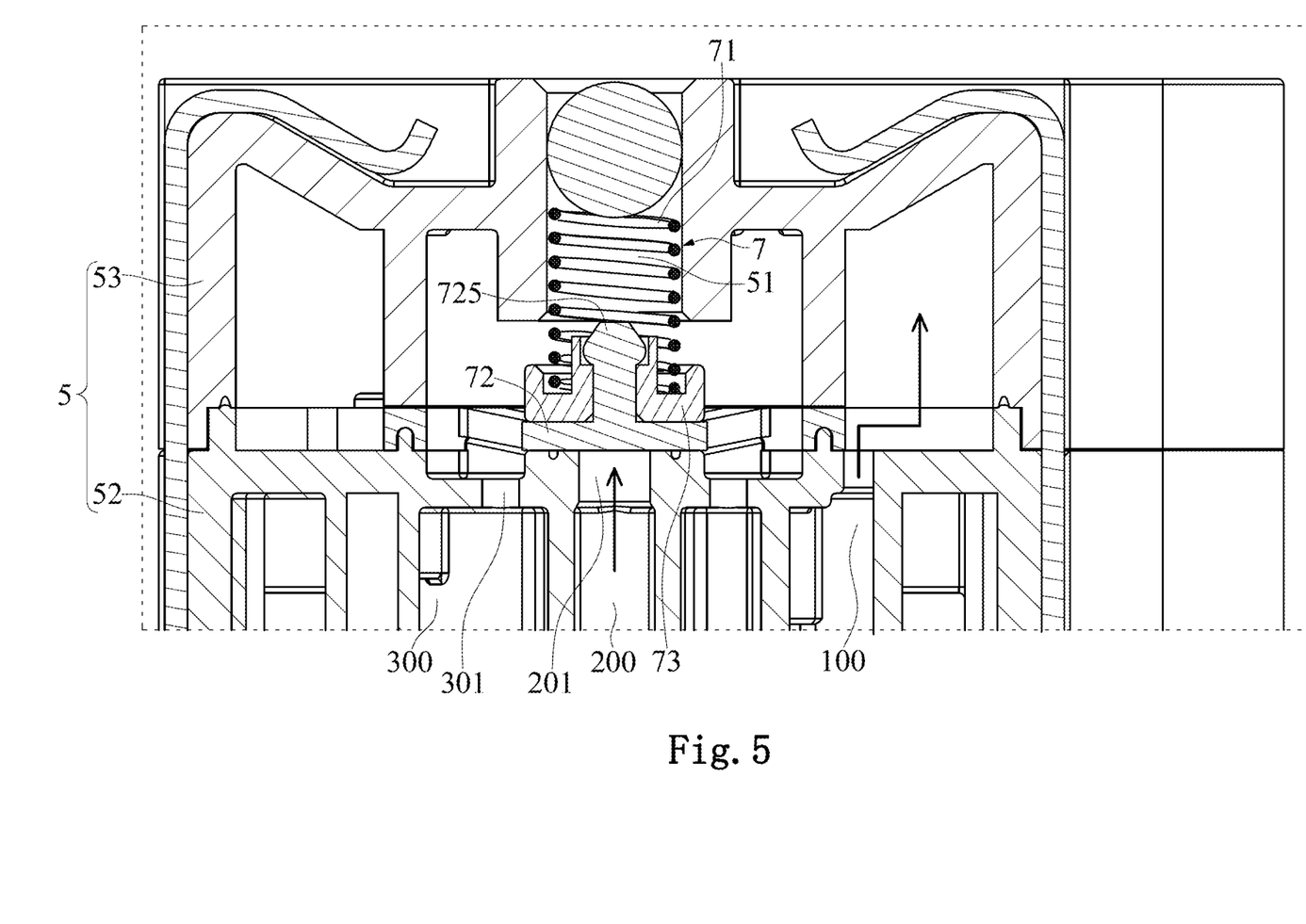
FIG. 5 is an enlarged view of the part V of the embodiment in FIG. 4 according to the present invention.
Figure 6:
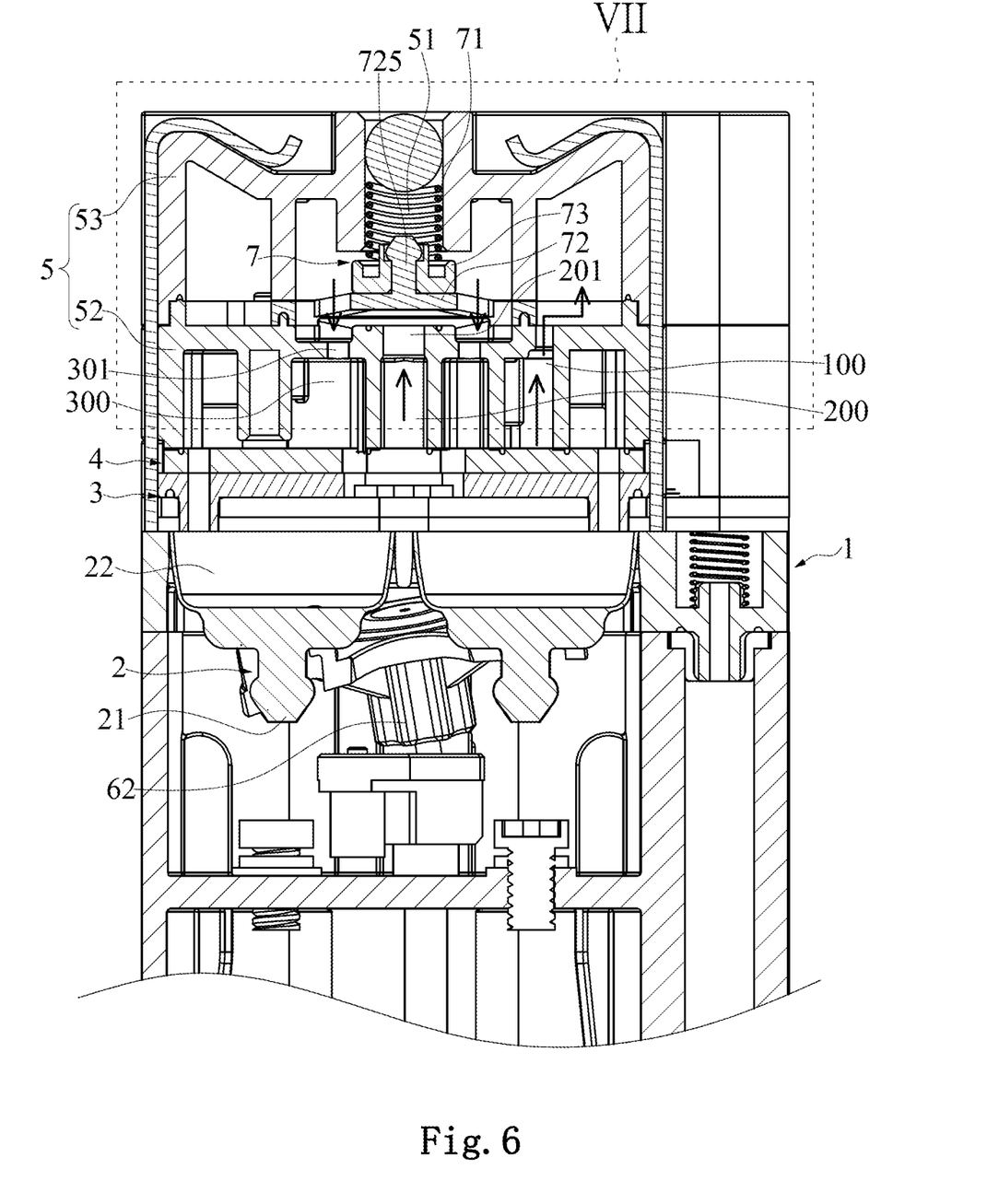
FIG. 6 is a sectional view of an embodiment of a pneumatic pump in which an overpressure protection valve is open according to the present invention.
Figure 7:
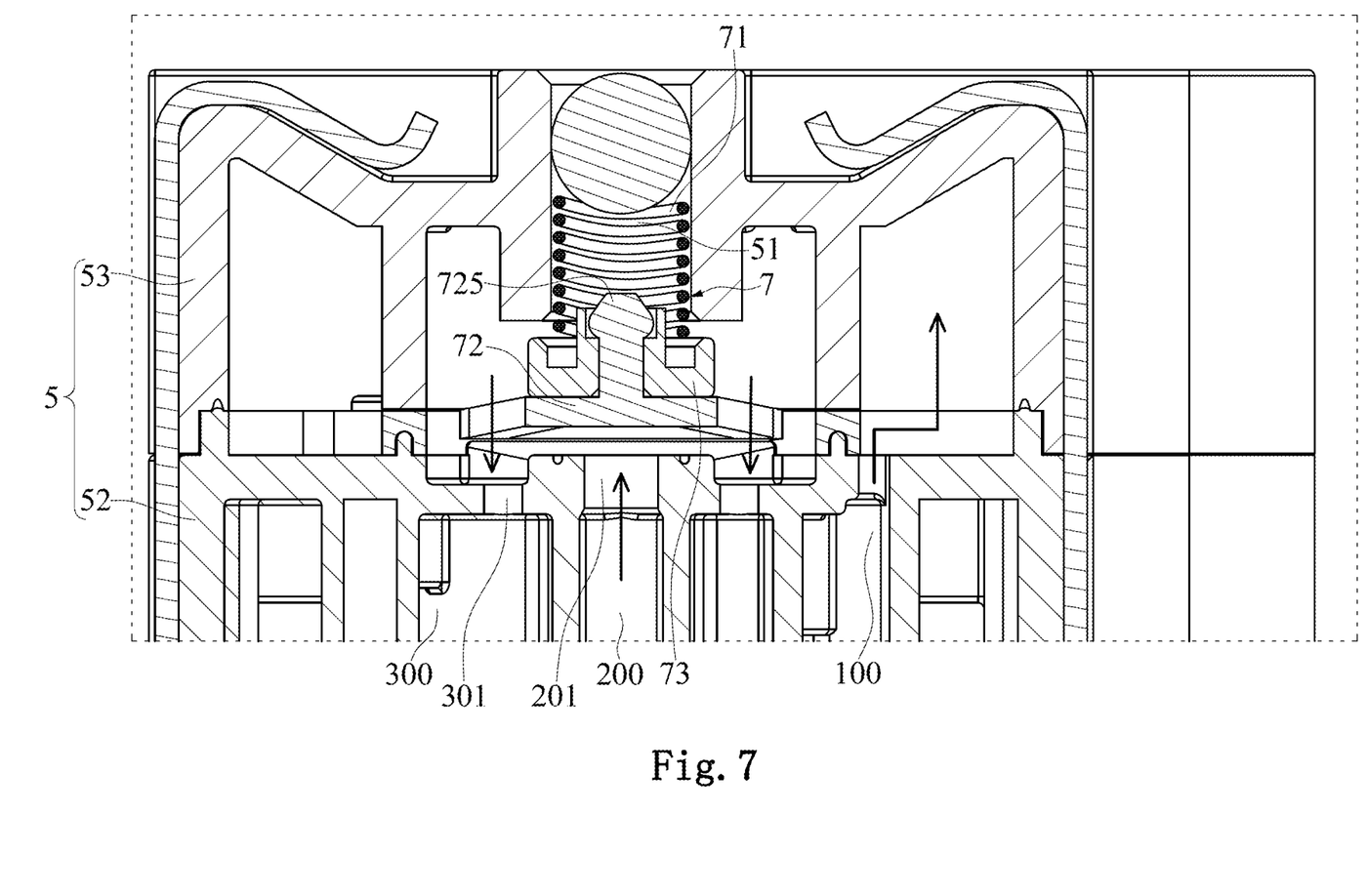
FIG. 7 is an enlarged view of the part VII of the embodiment in FIG. 6 according to the present invention.

The volume of the pump chamber 22 can be adjusted by using the driving device 6 that drives the diaphragm member 2 to act. When the volume of the pump chamber 22 is increased, air is suck from the surroundings to the pump chamber 22. As shown in FIG. 4 and FIG. 5, the air is exhausted from the pump chamber 22 and passed through the discharge channel 100 to be output when the volume of the pump chamber 22 is reduced. The air is transferred to the fluid chamber of the seat adjustment device through the pipelines for control of bladders to change the outline of the area where users sit on the seat. Refer to FIG. 6 and FIG. 7, the gasket 72 of the overpressure protection valve 7 compresses the spring 71 to open the sealed opening 201 of the air-flow channel 200 for pressure relief when the pressure in the pump chamber 22 is over the preset threshold. Thus the air will not be output completely through the discharge channel 100. A part of the air passes through the air-flow channel 200 and the backflow channel 300 and then turns back to the intake chamber 522 for preventing explosion of bladders for vehicle seats when load pressure gets too high. The turn-back air is sucked into the pump chamber 22 again to be output through the discharge channel 100 for improving work efficiency of the pneumatic pump.

In summary, the present invention features on that the diaphragm member is driven to act by the driving device for adjusting the volume of the pump chamber. During decreasing of the volume, the air is exhausted from the pump chamber and passed through the discharge channel to be output. The intake chamber is communicating with the spring chamber of the cap so as to avoid noises generated during discharge of the air through the overpressure protection valve to the atmosphere. At the same time, the air can be reused after the pressure relief process so that the work efficiency of the pneumatic pump is increased.

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. A pneumatic pump having an overpressure protection valve having a gasket and spring comprising: a diaphragm carrier;
    a diaphragm member disposed on the diaphragm carrier and having a plurality of interlocking parts;
    a valve base which is arranged at one end of the diaphragm carrier so that the diaphragm member is located between the diaphragm carrier and the valve base and a pump chamber is formed between the diaphragm member and the valve base;
    a valve that is disposed on the valve base;
    a cap which is arranged over both the valve base and the valve and comprising a spring chamber and an intake chamber communicating with the spring chamber;
    a driving device connected to the interlocking parts; and
    an overpressure protection valve mounted in the cap and having a gasket and a spring; the spring mounted in the spring chamber of the cap and abutting against the gasket for pushing the gasket to move toward the valve base and the valve;
    wherein a discharge channel, an air-flow channel and a backflow channel are formed among the pump chamber, the valve base, the valve and the cap; and the discharge channel is separated from the overpressure protection valve and the spring chamber; the gasket is disposed between the air-flow channel and the backflow channel while the air-flow channel is closed by the gasket so that the air-flow channel and the backflow channel are separated; wherein the driving device drives the diaphragm member to act for discharging air from the pump chamber through the discharge channel; wherein the gasket of the overpressure protection valve compresses the spring to open the air-flow channel when the pressure in the pump chamber is over a preset limit; thus air passes through the air-flow channel and the backflow channel; wherein the cap includes an inner cap and an outer cap disposed over the inner cap; the spring chamber is formed between the inner cap and the outer cap while the gasket is arranged at the inner cap; the gasket includes a central part, an outer ring spaced apart from and located outside the central part, and a plurality of ribs connected between the central part and the outer ring; the air-flow channel is closed by the central part of the gasket when the pressure in the pump chamber is under the preset limit; and
    wherein a seal ring is disposed on one side of the central part corresponding to the inner cap and a locking groove is arranged on one side of the outer ring corresponding to the inner cap; the seal ring abuts against the inner cap while the locking groove is locked with and connected to a locking body on the inner cap.

2. The pneumatic pump as claimed in claim 1, wherein the central part of the gasket is provided with a post and a spring-fixing base is slipped over the post; one end of the spring is fixed on the spring-fixing base.

3. The pneumatic pump as claimed in claim 1, wherein the gasket is disposed on one end of the air-flow channel that is away from the pump chamber while a sealed opening is formed on the one end of the air-flow channel that is away from the pump chamber; the sealed opening is arranged at the inner cap of the cap; a plurality of backflow ports formed on the cap is located between and communicating with the backflow channel and the sealed opening; the central part of the gasket, when the pressure in the pump chamber is under the preset limit, is put over the sealed opening for sealing the sealed opening so that the air-flow channel is closed; the seal ring is abutting against a periphery of the sealed opening on the inner cap; air in the air-flow channel flows through the sealed opening and the plurality of backflow ports and into the backflow channel when the gasket is moved and the sealed opening is opened.

4. The pneumatic pump as claimed in claim 1, wherein two positioning holes are arranged at an outer side of the outer ring while the inner cap is provided with two positioning pins; each of the two positioning pins is mounted into a respective-positioning hole.

5. The pneumatic pump as claimed in claim 1, wherein the driving device includes a motor and a transmission part which is connected between the motor and the interlocking parts of the diaphragm member.

\* \* \* \* \*